US012759844B2

(12) United States Patent
Burns

(10) Patent No.: US 12,759,844 B2
(45) Date of Patent: Oct. 13, 2026

(54) REVERSIBLE DOOR INTERLOCK FOR ELEVATORS

(71) Applicant: Commercial and Residential Elevator Supply LLC, Canton, GA (US)

(72) Inventor: Joseph D. Burns, Munster, IN (US)

(73) Assignee: Commercial and Residential Elevator Supply LLC, Canton, GA (US)

( * ) Notice: Subject to any disclaimer, the term of this patent is extended or adjusted under 35 U.S.C. 154(b) by 103 days.

(21) Appl. No.: 18/794,333

(22) Filed: Aug. 5, 2024

(65) Prior Publication Data

US 2025/0042697 A1 Feb. 6, 2025

Related U.S. Application Data

(60) Provisional application No. 63/530,792, filed on Aug. 4, 2023.

(51) Int. Cl.
*B66B 13/16* (2006.01)

(52) U.S. Cl.
CPC .................................... *B66B 13/16* (2013.01)

(58) Field of Classification Search
CPC ...................................................... B66B 13/16
See application file for complete search history.

(56) References Cited

U.S. PATENT DOCUMENTS 1,425,762 A * 8/1922 Girten ..................... B66B 13/16 187/280
1,476,710 A * 12/1923 Girten ..................... B66B 13/16 187/280
1,479,027 A * 1/1924 Clancy .................... B66B 13/16 187/331
1,514,016 A * 11/1924 Sanford .................. B66B 13/16 187/280
1,615,090 A * 1/1927 Lang ....................... B66B 13/16 187/280

(Continued)

FOREIGN PATENT DOCUMENTS

GB 506380 A * 5/1939 ............. B66B 13/16

OTHER PUBLICATIONS

Nationwide Lifts; "Atlas Interlock Thinnest Elevator Interlock in the world"; https://atlasinterlock.com; downloaded Dec. 9, 2024.

(Continued)

*Primary Examiner* — Diem M Tran
(74) *Attorney, Agent, or Firm* — Bradley Arant Bault Cummings LLP; Adam J. Thompson, Esq.

(57) ABSTRACT

An example door interlock includes a baseplate and a keeper removably and pivotally attached to the baseplate. The keeper includes a bore and a grooved opening, where the grooved opening is configured to connect to an arm, the arm connecting a door to the door interlock. The door interlock further includes an actuator including a cylinder. The actuator is configured to insert or retract the cylinder into or out of the bore, respectively, based on a positioning of an elevator, thereby causing the keeper to move between a locked configuration and an unlocked configuration, and causing the door to either be openable when the keeper is in the unlocked position or unopenable when the keeper is in the locked position.

20 Claims, 11 Drawing Sheets

(56) References Cited

U.S. PATENT DOCUMENTS

| | | | | | |
|---|---|---|---|---|---|
| 1,649,475 | A | * | 11/1927 | Jones | B66B 13/16 200/61.68 |
| 1,898,450 | A | * | 2/1933 | Hutton | B66B 13/16 187/331 |
| 3,122,615 | A | * | 2/1964 | Chace | H01H 9/223 200/50.15 |

OTHER PUBLICATIONS

Porta, Inc.; "Electro-Mechanical Door Lock" Rev. 1, Aug. 2007.

Honeywell; "RDI Series"; https://automation.honeywell.com/US/en/products/sensing-solutions/switches-and-controls/limit-switches/rdi-series; downloaded Dec. 9, 2024.

* cited by examiner

REVERSIBLE DOOR INTERLOCK FOR ELEVATORS

CROSS-REFERENCE TO RELATED APPLICATIONS

This application claims the benefit of and priority to U.S. Provisional Patent Application No. 63/530,792, filed Aug. 4, 2023, entitled "REVERSIBLE DOOR INTERLOCK SYSTEM FOR ELEVATORS," the content of which is hereby incorporated herein by reference in its entirety.

TECHNICAL FIELD

Various embodiments of the present disclosure relate generally to a door interlock for elevators and, more particularly, to a reversible door interlock for residential elevators.

BACKGROUND

Residential elevators are increasingly relied upon for transport between different floor levels, especially for larger homes, the elderly, or medically disabled. Residential elevators need to adhere to a set of guidelines and standards to ensure safety, accessibility, and functionality. Generally, to access a residential elevator, a swing door must first be opened and accessed. If the swing door is opened while the elevator is on a different level or in-use, users may accidentally step into the shaft of the elevator or run into other safety risks. Installation of door interlocks can prevent safety mishaps from occurring during use of residential elevators.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Residential elevators are increasingly relied upon for transport between different floor levels, especially for larger homes, the elderly, or medically disabled. Residential elevators need to adhere to a set of guidelines and standards to ensure safety, accessibility, and functionality. Generally, to access a residential elevator, a swing door must first be accessed. If the swing door is opened while the elevator is on a different level or in-use, users may accidentally step into the shaft of the elevator or run into other safety risks.

Door interlocks for residential elevators are generally installable for either left-handed swing doors ("left-handed doors") or right-handed swing doors ("right-handed doors"). A left-handed door can be characterized as a door where, from the direction of a user facing the door, the hinges are installed on the left side of the door. In this direction, the door would rotate counter-clockwise and translate to the left. A right-handed door can be characterized as a door where, from the direction of a user facing the door, the hinges are installed on the right side of the door. In this direction, the door would rotate clockwise and translate to the right.

It is generally known that separate door interlocks may need to be used for installation to a left-handed door or a right-handed door. Additionally, the size or footprint of a door interlock can determine repeatability of installation to different types and sizes of door frames and doors. Therefore, one or more embodiments of the present disclosure are directed to a door interlock that includes a baseplate, a keeper, and an actuator. The keeper is removably and pivotally attached to the baseplate, and the keeper includes a bore and a grooved opening. The grooved opening is configured to connect to an arm that connects a door to the door interlock. The actuator includes a cylinder, and the actuator is configured to insert or retract the cylinder into or out of the bore based on a positioning of an elevator, thereby causing the keeper to remain in an upright position or rotate in a counter-clockwise direction from the upright position, and causing the door to either be openable when the keeper is in the upright position or unopenable when the keeper is rotated in the counter-clockwise direction.

Figure 1:
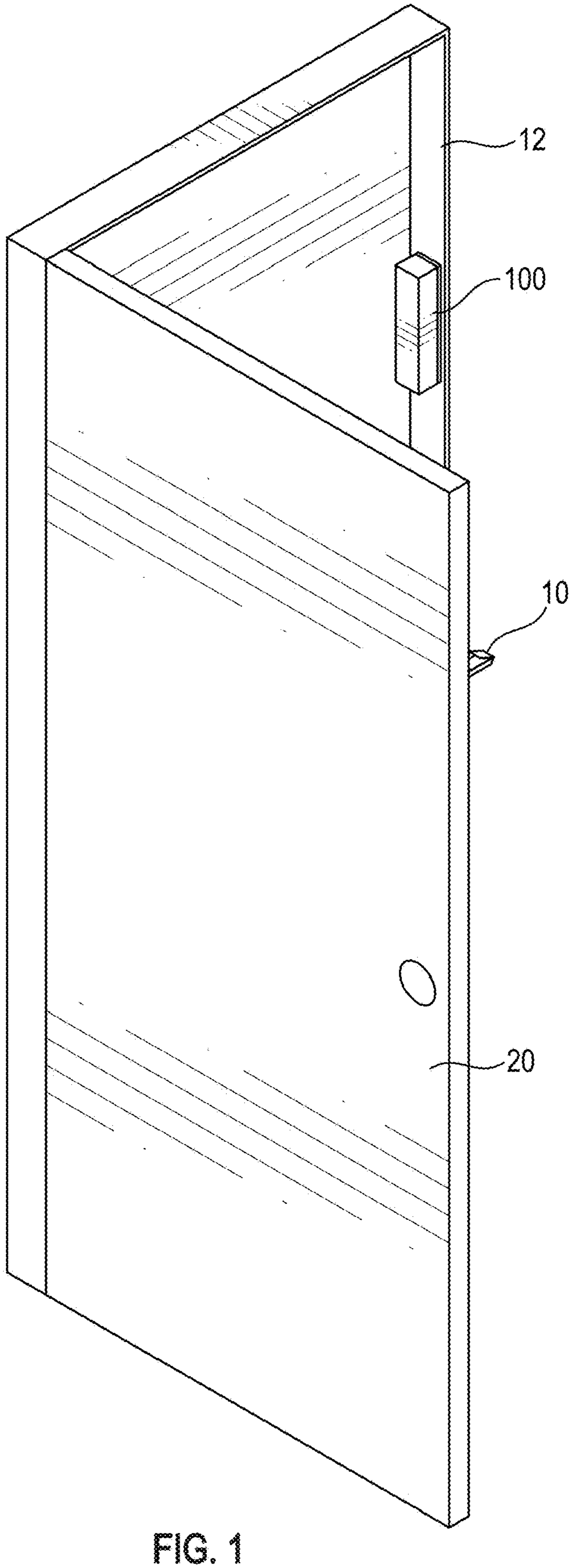
FIG. 1 depicts an example door interlock installed for use with a door according to one or more embodiments of the present disclosure.

Referring now to the drawings, FIG. 1 depicts a door interlock 100 installed for use with a door according to one or more embodiments of the present disclosure. The door interlock 100 is a device that can be installed to a door frame 12 of a door 20 for preventing unsafe access to a residential elevator. For example, as mentioned above, inadvertent opening of a door leading to a residential elevator when the elevator is in use or is stationed on a different floor can lead to serious accidents. As such, the door 20 is representative of a door a user must pass through to gain access to a residential elevator. The door interlock 100 can operate to ensure that the door 20, which can include a left-handed door or a right-handed door (e.g., swing doors), does not open when the elevator (not shown) is in use or is stationed on a different floor than a floor that the door interlock 100 is installed at. For example, the door interlock 100 can be configured to adjust between a first or locked configuration and a second or unlocked configuration based on a positioning of the elevator. For example, if the door interlock 100 is installed on floor one and the elevator is currently in use or is stationed at floor two, the door interlock 100 would be operating in the locked configuration. If the elevator is not in use and is stationed at floor one, the door interlock 100 would be operating in the unlocked configuration.

The door interlock 100 can be installed to the door frame 12 at a side opposite the hinges of the door 20, and arm 10 can be affixed to an edge of the door 20 and can extend outwardly so that the arm 10 is perpendicular from a face of the door 20. The arm 10 can include various types of latches and protrusions for releasable attachment to the door interlock 100 so that the door 20 can be either openable or unopenable by a user. In the locked configuration of the door interlock 100, the arm 10 remains securely locked with a keeper of the door interlock 100, and the door 20 is unopenable by a user. In the unlocked configuration, the arm 10 is released from the keeper, and the door 20 is openable by a user. The position of where the door interlock 100 and the arm 10 is installed is provided for exemplary purposes only. In practice, the door interlock 100 can be installed further up or further down the door frame 12 than is currently depicted, and the arm 10 can be installed commensurately further up or further down the door 20 to remain aligned with the positioning of the door interlock 100, based on user preferences, door and door frame specifications, and other factors.

Figure 2A:
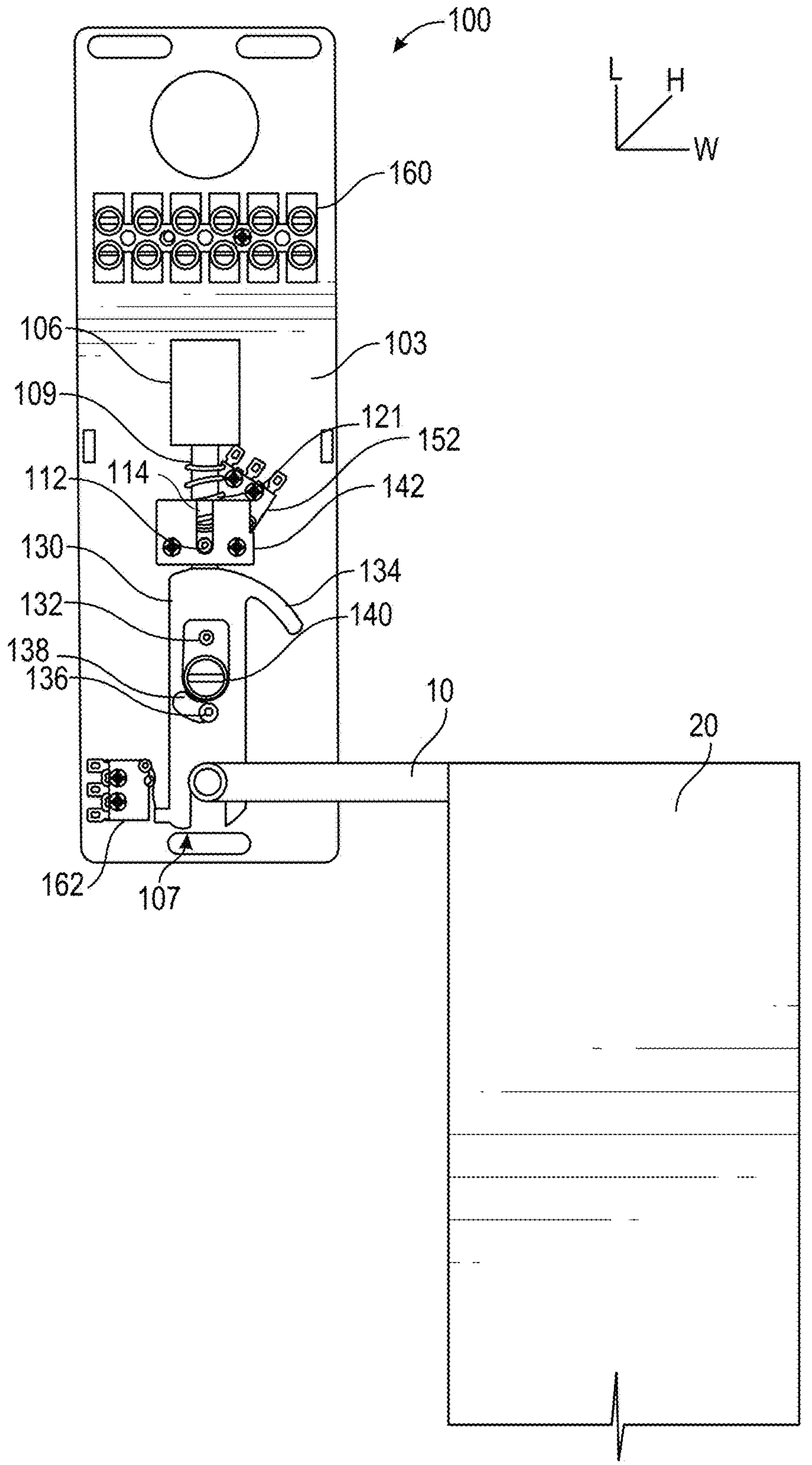
FIG. 2A depicts the door interlock shown in FIG. 1 in a first or locked configuration according to one or more embodiments of the present disclosure.
Figure 2B:
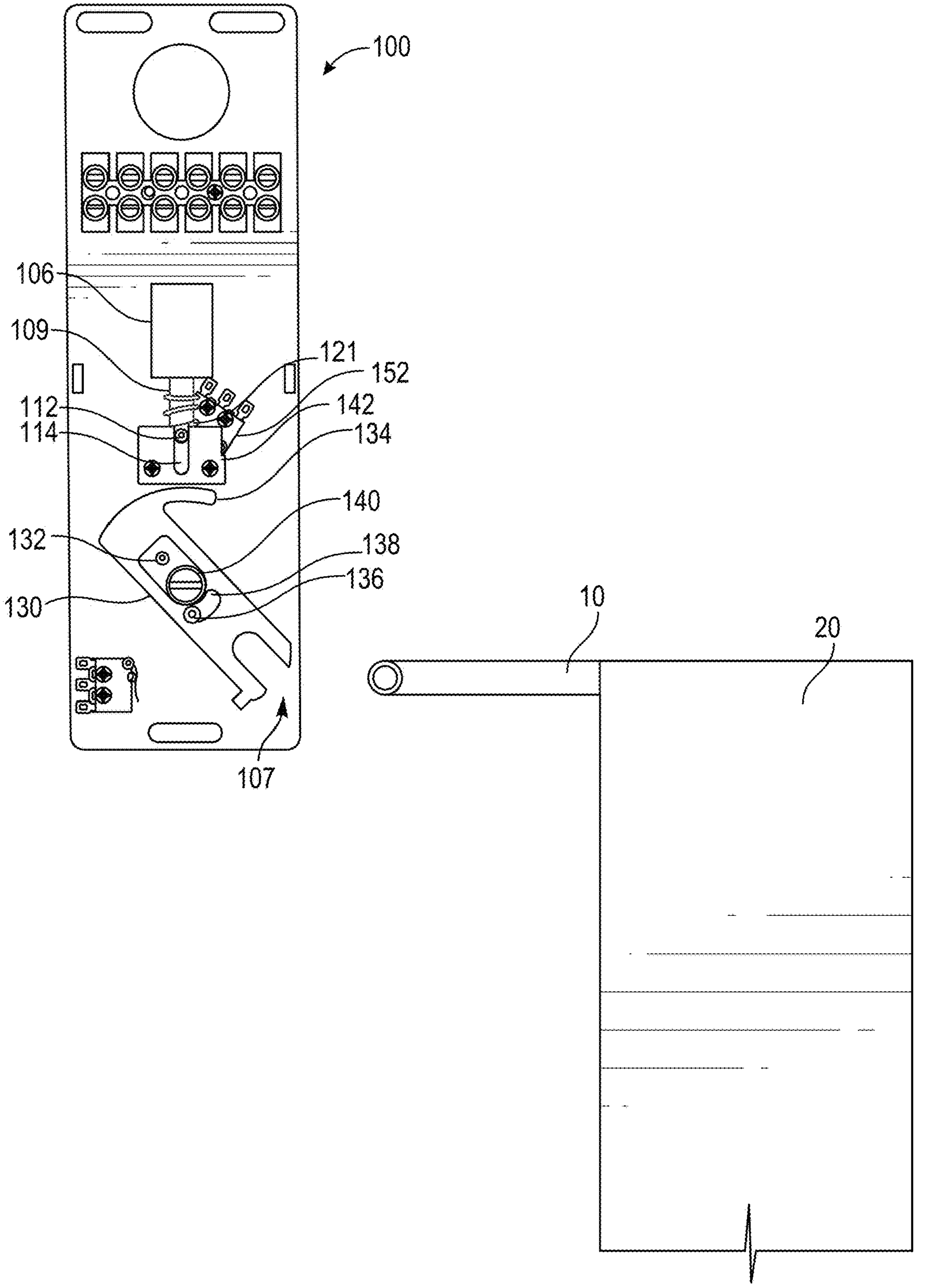
FIG. 2B depicts the door interlock shown in FIG. 2A in a second or unlocked configuration according to one or more embodiments of the present disclosure.

FIG. 2A depicts the door interlock 100 in a first or locked configuration, and FIG. 2B depicts the door interlock 100 in a second or unlocked configuration, according to one or more embodiments of the present disclosure. The door interlock 100 is not exhaustively illustrated, meaning that other components not shown in FIG. 2 can be included or relied upon in some cases. Similarly, one or more components shown in FIG. 2 can be omitted in some cases.

The door interlock 100 includes a baseplate 103, a keeper 130 removably and pivotally attached to the baseplate 103, an actuator 106 configured to engage the keeper 130 to cause the door interlock 100 to be in the locked configuration or the unlocked configuration, a guide 142, a first switch 152, a second switch 162, and a wire passageway 160, among other components and devices. The door interlock 100 can also be provided with an arm 10 which can be used for installation or connection to the door 20. The arm 10 can include a latch or protrusion for locking to keeper 130. The actuator 20 can include actuators that produce linear or rotary motion such as solenoids, electric actuators, and pneumatic actuators, among other types of actuators. The actuator 20 includes a piston or cylinder 109 and is connected to a controller (not shown) via the wire passageway 160. The controller can include programmable logic controllers (PLCs), smart home controllers, relay controllers, microcontrollers, and other types of controllers which can accept and manage input signals originating from the door interlock 100 and the residential elevator. The wire passageway 160 is a device or component where electrical wires can be routed through for connection to the controller.

The actuator 106 is configured to extend or retract the cylinder 109, into or out of a bore (shown in FIG. 4) of the keeper 130, based on control signals (e.g., control signals that indicate where the elevator is or if the elevator is in use) received from the controller, which can effectively transition the door interlock 100 from the locked position to the unlocked position and vice-versa. A spring 121 that encircles or curls around the cylinder 109 can ensure that the cylinder 109 is not retracted too far into the actuator 106. During the insertion and retraction of the cylinder 109 into and from the bore of the keeper 130, the guide 142 functions to ensure that the cylinder 109 does not rotate clockwise or counterclockwise and contacts the first switch 152. For example, a guide rod 112 is configured to move with the cylinder 109 and is positioned within a U-shaped groove 114 of the guide 142 as depicted. The guide rod 112 remains within the groove 114 during movement of the cylinder 109 and ensures that the cylinder 109 does not rotate during insertion into and retraction out of the bore of the keeper 130. The guide 142 is a bracket that is fastened or affixed to the baseplate 103 and helps to maintain vertical alignment of the cylinder 109 during insertion into and retraction out of the bore of the keeper 130.

The first switch 152 is configured to relay information about a positioning of the cylinder 109 to the controller. The second switch 162 is configured to relay information about a positioning of the keeper 130 to the controller. The first switch 162 can be configured to transmit information to the controller that the door interlock 100 is in the unlocked configuration, and the second switch 162 can be configured to transmit information to the controller that the door interlock 100 is in the locked configuration.

The keeper 130 includes a U-shaped grooved opening 107 at a proximal opening of the keeper 130 and an arm 134 that extends in a curved and outward manner (e.g., arc-like extension) from a distal end of the keeper 130. The keeper 130 is configured to rotate in a counter-clockwise direction based on insertion or retraction of the cylinder 109 into or out of the bore of the keeper 130, thereby either causing the door 20 to be unopenable or openable by a user. The keeper 130 includes an arcuate slot 138 and can be configured to pivot counter-clockwise based on an extent of the arcuate slot 138. For example, in the unlocked configuration, the keeper 130 can be configured to pivot counter-clockwise until a stop 136 abuts the opposite end of the arcuate slot 138, thereby limiting further counter-clockwise rotation of the keeper 130. The limit of rotation of the keeper 130 is determined by an extent of the arcuate slot 138 and its interaction with the stop 136. The keeper 130 is also rotatably attached to the baseplate 103 by pivot 140, which is a fastener such as a bolt, stud, or another attachment mechanism. The stop 136 can include various fasteners such as studs, screws, etc.

The door 20 is representative of a swing door such as shown in FIG. 1. Although the door 20 shown in FIG. 1 is a left-handed door, the door 20 shown in FIGS. 2A and 2B is a right-handed door. The door interlock 100 can be housed or partially enclosed with a cover or a housing, which will be discussed in the following paragraphs. Further aspects of how the door interlock 100 can adjust from the locked configuration to the unlocked configuration and vice-versa are provided below.

Still referring to FIG. 2A, the door interlock 100 is in the locked configuration, and the door 20 is unopenable by a user. This locked configuration corresponds to the elevator currently being in-use or stationed on a different floor than the floor the door interlock 100 is installed at. In the locked configuration, the actuator 106 activates the cylinder 109 so that the cylinder 109 is inserted into the bore of the keeper 130, causing the keeper 130 to remain locked in the upright position as depicted. In this position, the keeper 130 securely locks the arm 10 via the grooved opening 107 so that the door 20 is unopenable by a user. The keeper 130 can be equipped with a tension adjustment mechanism by way of a spring and ball bearing assembly 132 ("bearing assembly 132"), which will be discussed in greater detail in the later paragraphs.

Referring now to FIG. 2B, the door interlock 100 is in the unlocked configuration, and the door 20 is openable by a user. As depicted, the door 20 has been opened and separated from the door interlock 100 (e.g., a user has opened the door 20). The unlocked configuration corresponds to the elevator not being in use and stationed at the same floor the door interlock 100 is installed at. As compared to FIG. 2A, the cylinder 109 is completely retracted out of the bore of the keeper 130. For example, the cylinder 109 is partially retracted back into the actuator 106 in a vertical direction, and the guide rod 112 is also pulled upwards vertically while maintaining position in the groove 114. As the cylinder 109 is retracted back into the actuator 106, the guide rod 112 further ensures that the cylinder 109 contacts the first switch 152 so that the first switch 152 can relay information to the controller that the door interlock 100 is in the unlocked configuration. The positioning of the guide rod 112 within the groove 114 enables the cylinder 109 to maintain vertical alignment (e.g., preventing side-to-side or clockwise or counter-clockwise rotation) during the retraction process.

Once the cylinder 109 is retracted out from the bore of the keeper 130, the keeper 130 can be configured to pivot counter-clockwise relative to the pivot 140. For example, the pivot 140 remains stationary and is affixed to the baseplate 103 so that the keeper 130 can rotate counter-clockwise as depicted. An extent to which the keeper 130 rotates is determined by the interaction of the stop 136 to the arcuate slot 138. For example, as the keeper 130 rotates counter-clockwise relative to the pivot 140, the stop 136 can eventually reach an end of the arcuate slot 138 as depicted in FIG. 2B. As compared to FIG. 2A, the stop 136 abuts the opposite end of the arcuate slot 138, and the keeper 130 is hard-limited from rotating any further in the counter-clockwise direction. As such, the stop 136 is operable as a hard stop to prevent unnecessary rotation of the keeper 130. The rotation of the keeper 130 may also be influenced by the bearing assembly 132, where a user can adjust a spring tension of the bearing assembly 132 to adjust sensitivity of the keeper 130 to rotational forces.

Once the cylinder 109 is retracted out from the bore of the keeper 130, the door 20 is releasable to be opened by a user. For example, as depicted, a user can open the door 20 to gain access to the elevator. A user can close the door 20 so that the door interlock 100 can be configured to operate in the locked configuration from the unlocked configuration. For example, if a user closes the door 20, the arm 10 will mate again with the keeper 130 via the grooved opening 107. If the elevator is in use or on a different floor to that which the door interlock 100 is installed at, the actuator 106 will insert the cylinder 109 into the bore of the cylinder 109, to complete the adjustment to the locked configuration. The door interlock 100 can be configured to adjust to the unlocked configuration once the elevator is back to not being in use and at the same floor level as the floor level the door interlock 100 is installed at.

The keeper 130 is reversibly attachable to the baseplate 103 to support installation of the door interlock 100 to either left-handed doors or right-handed doors. For example, during installation, the pivot 140 may be unscrewed or removed which would enable removal and reinstallation of the keeper 130 for a different door configuration. For a left-handed door configuration, the keeper 130 would be flipped 180° about a vertical axis and installed to the baseplate 103, which would cause the arm 134 to extend toward an opposite side of the baseplate 103 as compared to what is depicted in FIG. 2A. Further description regarding reversibility of the keeper 130 is provided with respect to FIGS. 7A and 7B.

The removability and reversibility of the keeper 130 facilitates easy install for technicians on-site to a wide range of doors and also saves on manufacturing costs associated with having to carry two sets of door interlocks, one for a left-handed door and one for a right-handed door, for example. In some example embodiments, it may be advantageous to provide an interlock system having a more compact geometry than previously known devices, for example to install in confined spaces, to minimize spatial interferences, and/or for aesthetic purposes. In example embodiments according to the present disclosure, the door interlock 100 has a compact and space-efficient configuration. For example, in some embodiments, the overall external housing of the door interlock 100 may fit within a three-dimensional spatial envelope of less than 2" (two inches) in width, less than 9" in length, and/or less than 2.25" in height or thickness. In particular example embodiments, the door interlock 100 has physical dimensions ranging from approximately 2 inches in width, 6.75 inches in length, and 2.25 inches in height to approximately 2 inches in width, 8.75 inches in length, and 2.25 inches in height or thickness.

Figure 3A:
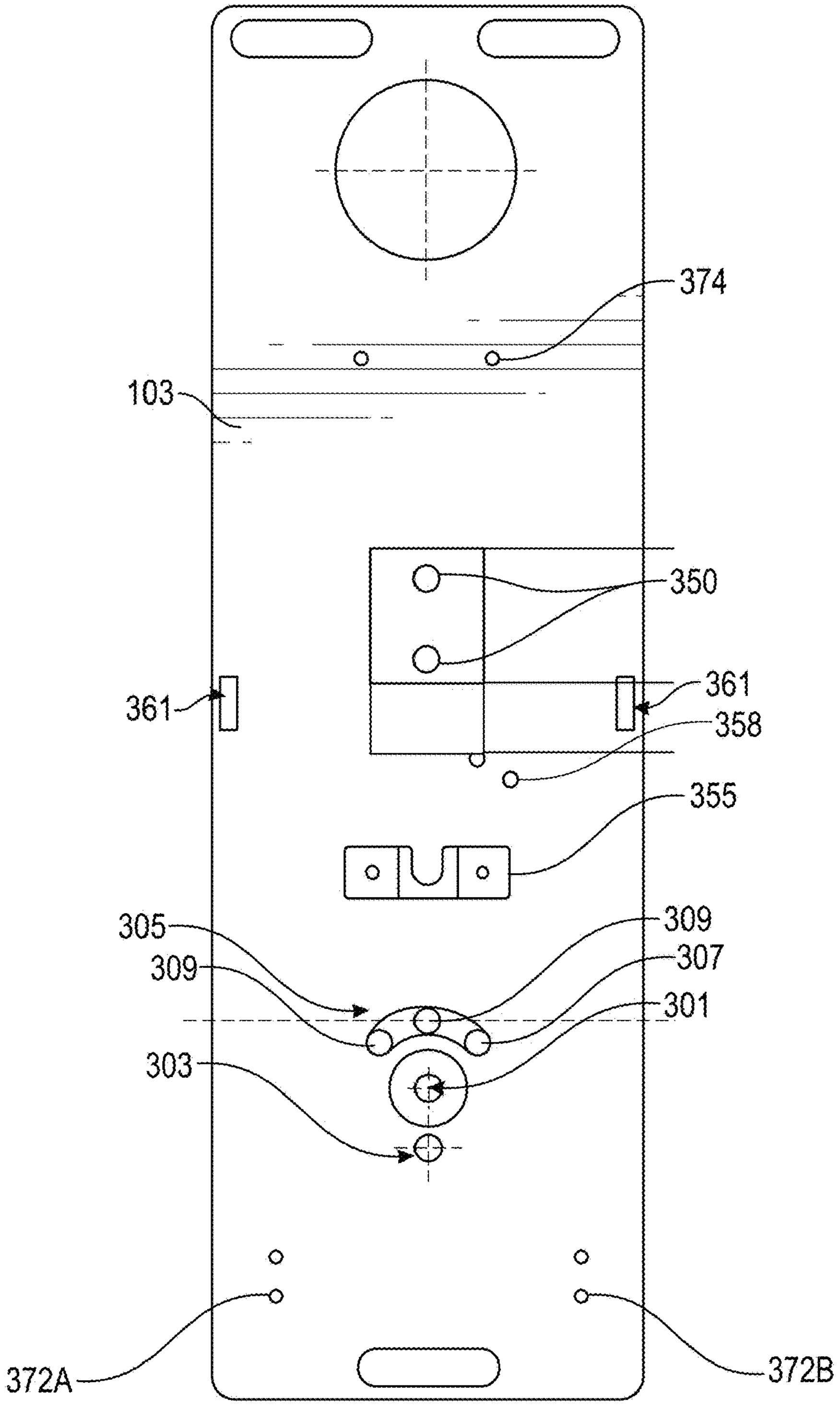
FIG. 3A depicts a top-down view of a baseplate of the door interlock shown in FIG. 1 according to one or more embodiments of the present disclosure.
Figure 3B:
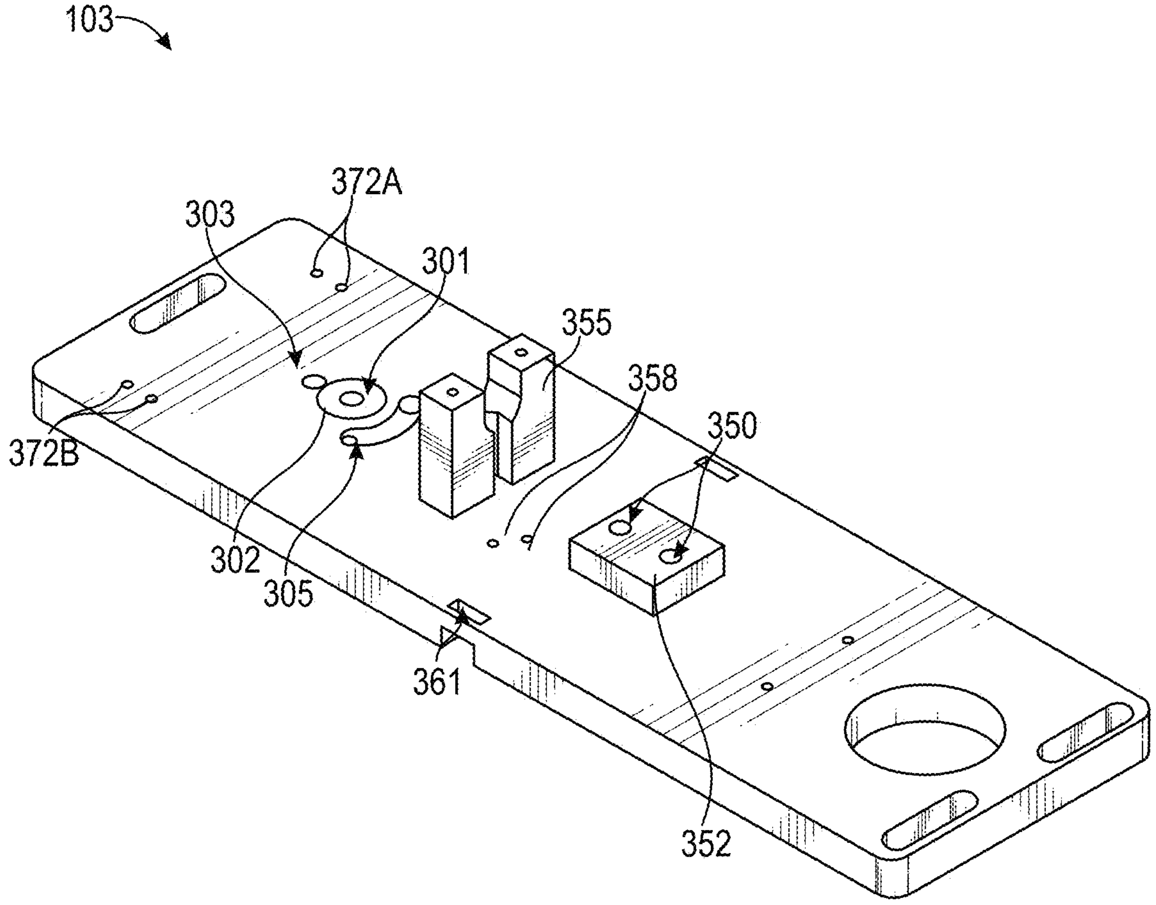
FIG. 3B depicts a perspective view of the baseplate according to one or more embodiments of the present disclosure.

FIG. 3A depicts a top-down view of the baseplate 103, and FIG. 3B depicts a perspective view of the back plate 103 according to one or more embodiments of the present disclosure. The baseplate 103 includes actuator holes or actuator connection points 350 for attaching or fastening the actuator 106 to the baseplate 103, cover connection points 361 for attaching or fastening a cover to the baseplate 103, a mounting component 355 for the guide 142, a positioning valley 305, a pivot connection point 301, a stop connection point 303, first switch connection point 358, second switch connection points 372A and 372B, and wire passageway connection points 374, among other components and structures.

The mounting component 355 can be integrally formed with the baseplate 103 or may be affixed or attached to the baseplate 103. The mounting component 355 is raised from a surface of the baseplate 103 and can be used for receiving or fastening the guide 142 to the baseplate 103. The positioning valley 305 is used for receiving the bearing assembly 132, which can include a ball plunger. The bearing assembly 132 is guided "downhill" from a center point 307 and towards a depressed endpoint 309 present on each side of the center point 307. The movement of the bearing assembly 132 from an elevated position of the center point to the depressed endpoint 309 can release the spring tension and cause the keeper 130 to adjust from the locked configuration to the open configuration. The tension in the bearing assembly 132 can be adjusted by moving the bearing assembly up or down within an adjustment port (shown in FIG. 4) relative to the baseplate 103. Adjusting the spring tension within the bearing assembly 132 can adjust the sensitivity of the keeper 130 from adjusting to the unlocked configuration from the locked configuration and vice-versa.

The pivot connection point 301 has an elevated section 302 and is used to connect or attach the pivot 140 to the baseplate 103. The stop connection point 303 is used to attach the stop 136 to the baseplate 103. The actuator connection points 350 may be integrally formed via a rectangular or square structure that rises from a surface of the baseplate 103. The actuator connection points 350 are formed a raised surface 352 which is formed through the rectangular structure and extends into the baseplate 103. The first switch connection point 358 is used to connect or attach the first switch 152 to the baseplate 103. The second switch 162 can be attached to the baseplate 103 via either second switch connection points 372A or 372B. For example, the second switch 162 as depicted in FIGS. 2A and 2B is attached via the second switch connection point 372A. If the door 20 is a left-handed door, the second switch 162 can be detached from the second switch connection point 372A and attached to the second switch connection point 372B.

Figure 4A:
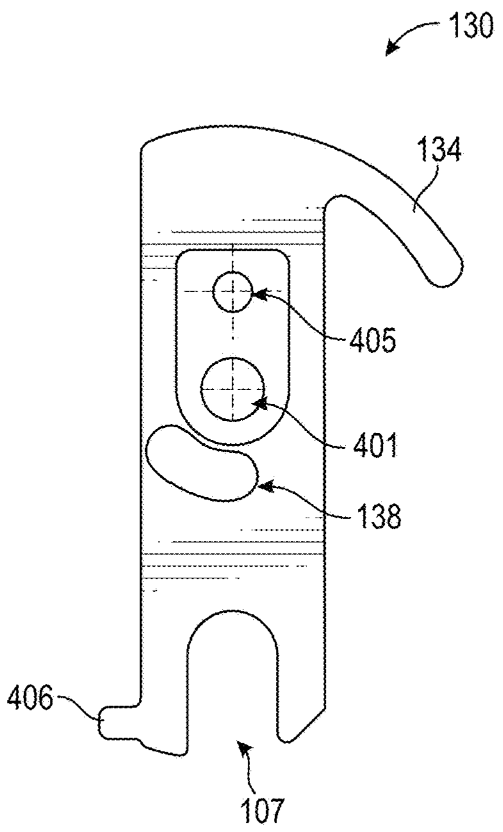
FIG. 4A depicts a front view of a keeper of the door interlock shown in FIG. 1 according to one or more embodiments of the present disclosure.
Figure 4B:
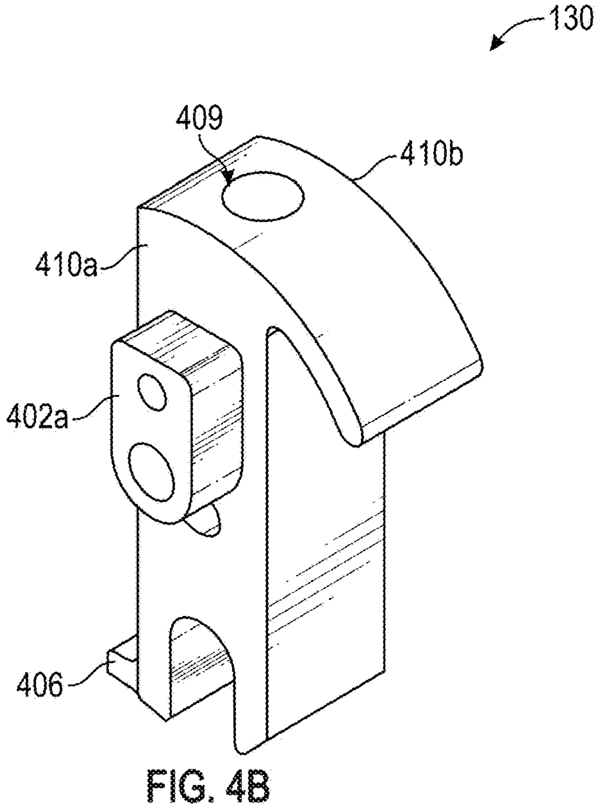
FIG. 4B depicts a perspective view of the keeper according to one or more embodiments of the present disclosure.
Figure 4C:
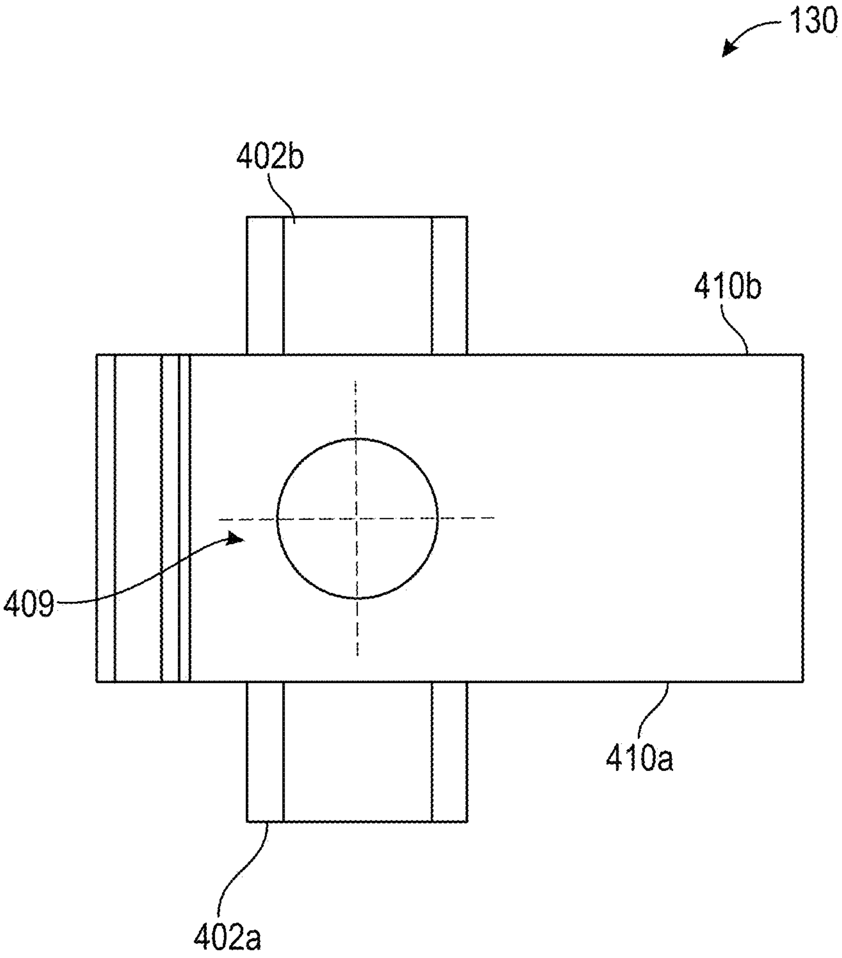
FIG. 4C depicts a top-down view of the keeper according to one or more embodiments of the present disclosure.

FIG. 4A depicts a front view of the keeper 130, FIG. 4B depicts a perspective view of the keeper 130, and FIG. 4C depicts a top-down view of the keeper 130, according to one or more embodiments of the present disclosure. The keeper 130 includes a bore 409 that is configured to receive the cylinder 109 of the actuator 106. The keeper 130 further includes a first face 410A and a second face 410B, where the second face 410B is opposite the first face 410A. A first raised structure 402A is integrally formed on the first face 410A, and a second raised structure 402B is integrally formed on the second face 410B. In some cases, the raised structures 402A and 402B may be attached to the first face 410A and the second face 410B, respectively. The keeper 130 further includes a pivot hole or pivot connection point 401 for accepting or connecting the pivot 140 and a bearing assembly hole or bearing assembly connection point 405 for accepting or connecting the bearing assembly 132. The keeper 130 further includes a protrusion 406 that extends from a side of the keeper 130 opposite the side that the arm 134 extends from.

Figure 5A:
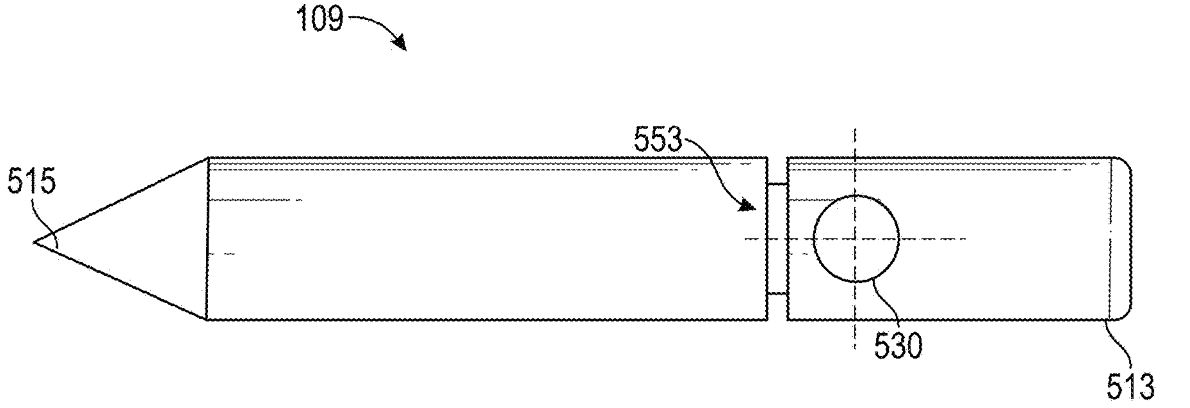
FIG. 5A depicts a top-down view of a cylinder of the door interlock shown in FIG. 1 according to one or more embodiments of the present disclosure.
Figure 5B:
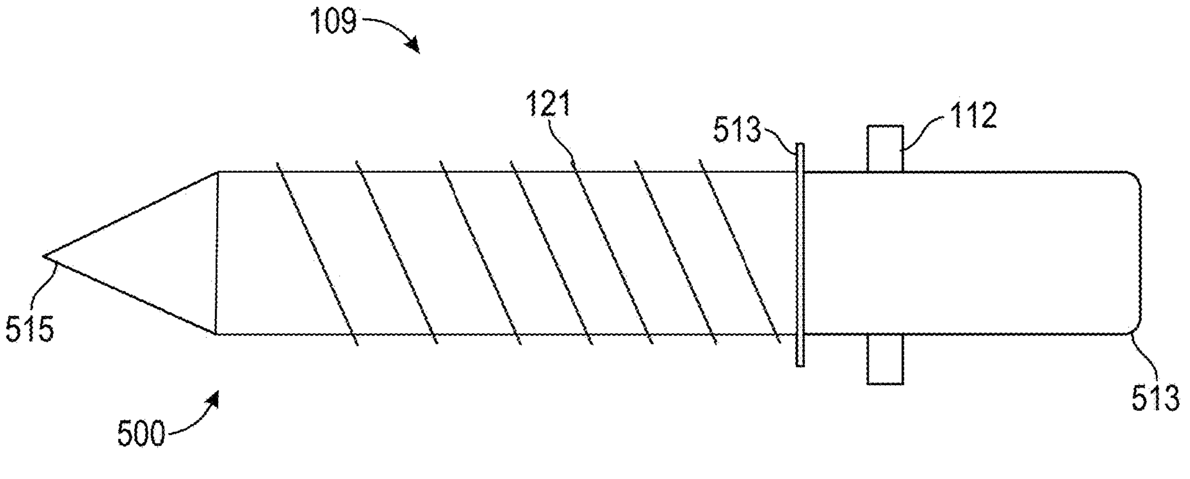
FIG. 5B depicts a side view of the cylinder according to one or more embodiments of the present disclosure.

FIG. 5A depicts a top-down view of the cylinder 109, and FIG. 5B depicts a side view of the cylinder 109 according to one or more embodiments of the present disclosure. The cylinder 109 includes a first end 515 that is retained within the actuator 106 and a second end 513 that is inserted into and retracted out of the bore 409 based on the positioning of the elevator. The cylinder 109 includes a guide rod hole or connecting point 530 for allowing passthrough of the guide rod 112. The spring 121 encircles or curls around the cylinder 109 to ensure that the first end 515 is not retracted too far into the actuator 106. The spring 121 is attached to the cylinder 109 by way of a snap ring 513. The snap ring 513 is retained onto the cylinder 109 via a groove 553.

Figure 6:
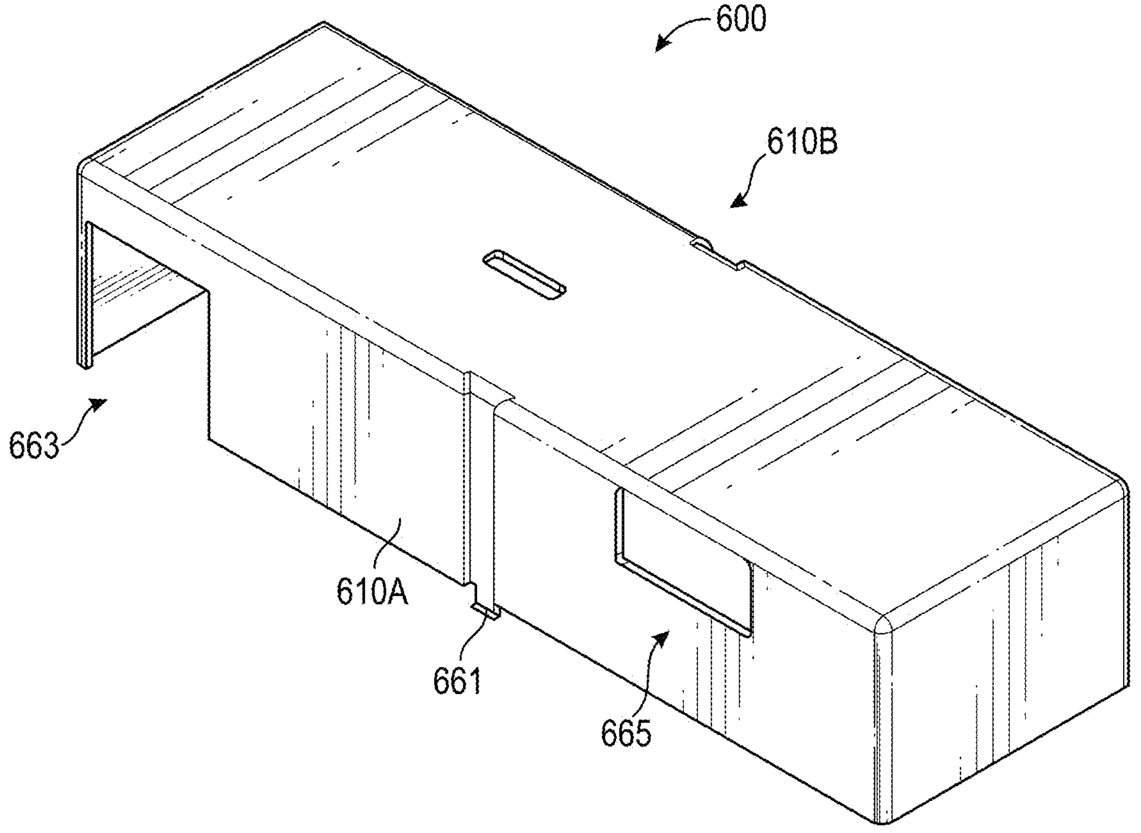
FIG. 6 depicts a housing or cover for the door interlock shown in FIG. 1 according to one or more embodiments of the present disclosure.

FIG. 6 depicts a housing or cover 600 for the door interlock 100 according to one or more embodiments of the present disclosure. The cover 600 includes a first face 610A and a symmetric second face 610B. For example, the components formed with respect to the first face 610A are symmetrically formed also on the second face 610B in a mirror-like configuration. To this extent, the cover 600 includes a protrusion 661 that is formed on the first face 610A and the second face 610B for attaching to the door interlock 100. For example, the cover 600 can attach to the door interlock 100 by way of the protrusion 661 attaching to the cover connection point 361. The cover 600 also includes a first opening 663 and a second opening 665 formed on each face 610A and 610B for allowing passthrough of the wires and the arm 10. The symmetric, mirror-image configuration of the housing or cover 600 allow for operability with the reversible internal locking mechanism in either the right-hand door swing or left-hand door swing configuration, without requiring different housing or cover parts for each configuration. Optionally, the openings 663 and 665 may be provided with removable knock-out covers, so that the installer may selectively remove the knock-outs on the openings required for the intended installation configuration (right-hand door swing or left-hand door swing), and leave the unused openings covered.

Figure 7A:
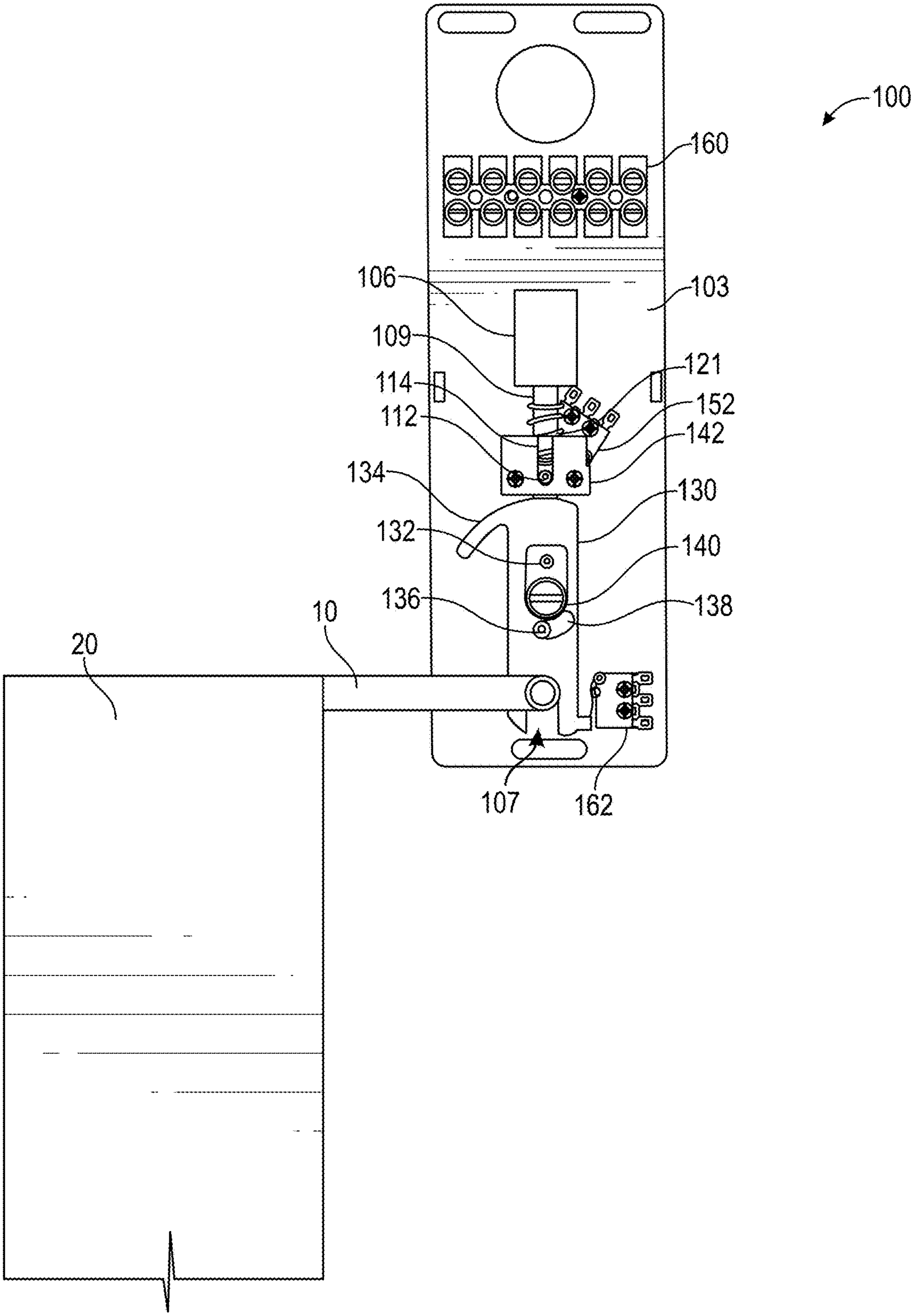
FIG. 7A depicts the door interlock shown in FIG. 1 in a locked configuration with a reversed keeper, according to one or more embodiments of the present disclosure.

FIG. 7A depicts the door interlock 100 in a locked configuration with a reversed keeper, according to one or more embodiments of the present disclosure. As discussed previously, the keeper 130 can be removed from the baseplate 103 and reinstalled to the baseplate in a reverse orientation based on a configuration of the door 20. For example, the keeper 130 in FIGS. 2A and 2B was installed in the door interlock 100 for a right-handed door (e.g., the door 20 is configured as a right-handed door in FIGS. 2A and 2B). In FIG. 7A, the keeper 130 is installed in the door interlock 100 in a reverse mirror-imaged configuration as compared to the keeper 130 in FIG. 2A. In other words, the keeper 130 is flipped 180° about a vertical axis in FIG. 7A as compared to the keeper 130 in FIG. 2A. The positioning of the keeper 130 in the reverse mirror-image configuration in FIG. 7A is exemplified by the mirror-imaged positionings of the arm 134 and the arcuate slot 138 as compared to the positioning of the arm 134 and the arcuate slot 138 in FIG. 2A. In addition, the second switch 162 in FIG. 7A is also reinstalled to the second switch connection point 372B as compared to 372A for the second switch 162 in FIG. 2A. Other components of the door interlock 100 remain unchanged as compared to the door interlock 100 shown in FIG. 2A.

Figure 7B:
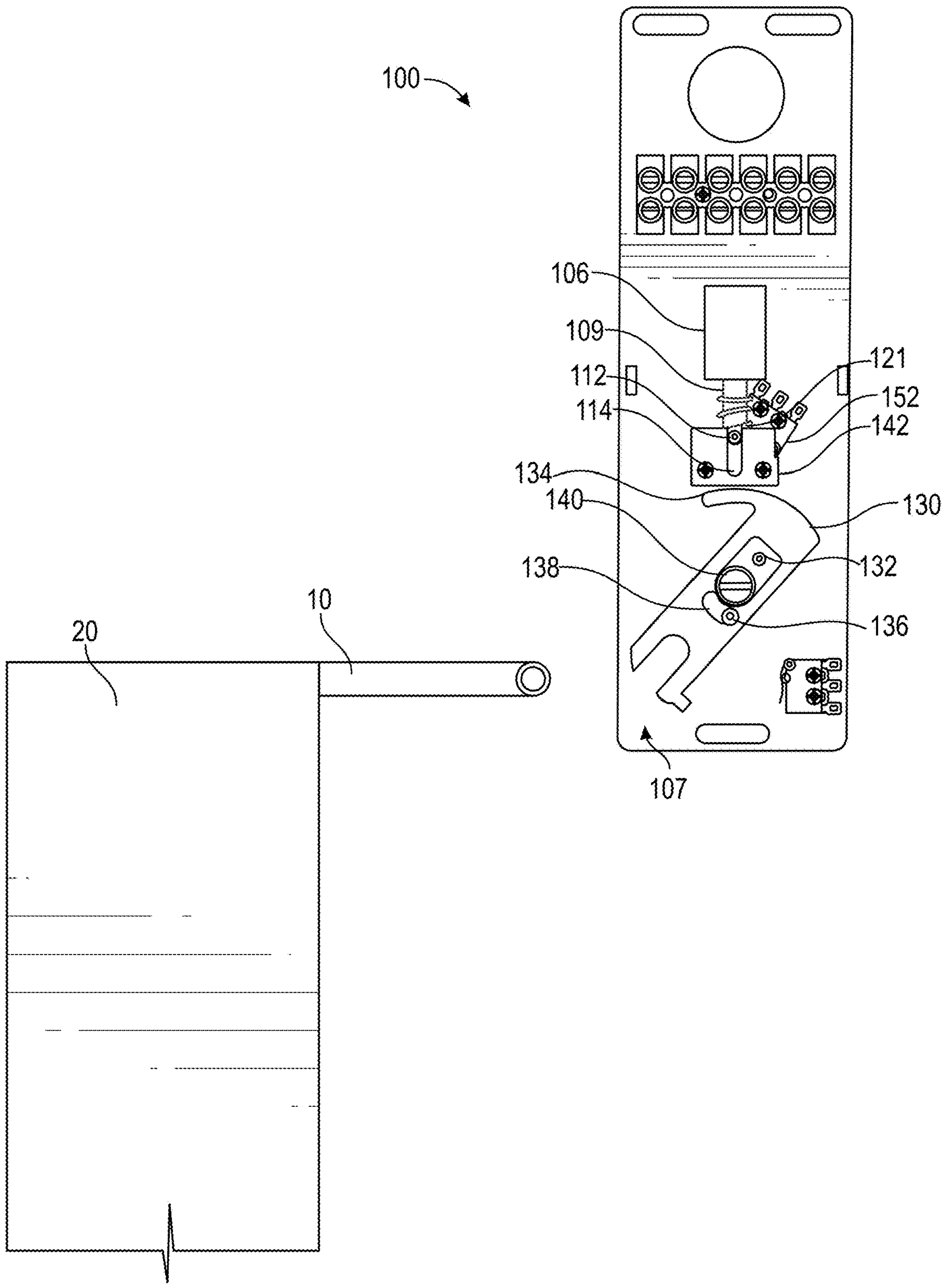
FIG. 7B depicts the door interlock shown in FIG. 7A in an unlocked configuration with the reversed keeper, according to one or more embodiments of the present disclosure.

FIG. 7B depicts the door interlock 100 shown in FIG. 7A in an unlocked configuration with the reversed keeper, according to one or more embodiments of the present disclosure. The door interlock 100 transitioning from the locked configuration shown in FIG. 7A to the unlocked configuration shown in FIG. 7B is similar to the transition of the door interlock 100 from the locked configuration shown in FIG. 2A to the unlocked configuration shown in FIG. 2B. However, due to the keeper 130 being installed in the reverse mirror-image configuration in FIG. 7A, the keeper 130 is configured to rotate clockwise instead of counter-clockwise (which was the case of the keeper 130 in FIG. 2B) based on the orientation of the arcuate slot 138. For example, once the cylinder 109 is retracted out of the bore 409, the keeper 130 is configured to rotate clockwise and away from the door 20, up to the extent of the arcuate slot 138 (e.g., the interaction of the stop 136 abutting an opposite end of the arcuate slot 138 when the keeper 130 is rotated), which releases the arm 10 from the grooved opening 107, thereby causing the door 20 to be openable by a user. In particular, the keeper 130 is configured to rotate clockwise about the pivot 140 until the opposite end of the arcuate slot 138 abuts the stop 136, which limits the keeper 130 from rotating further. As can be seen in FIG. 7B, the door 20 has already been opened by a user (e.g., the door 20 is rotated and translated to the left as compared to the door 20 in FIG. 7A).

Aspects of a reversible door interlock for residential elevators have been described. For example, the door interlock 100 includes a footprint that is smaller than conventional door interlocks for residential elevators, which can facilitate installation to a wide variety of doors and door frames. Additionally, the door interlock 100 is reversible to further accommodate installation to a wide variety of doors and door frames. Furthermore, the door interlock 100 implements a streamlined locking and unlocking mechanism to promote safety for the use of residential elevators.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as “on,” “below,” “upper,” and “lower” are used in the specification to describe the relative relationship of one component to another component, these terms are used in this specification for convenience only, for example, as a direction in an example shown in the drawings. It should be understood that if the device is turned upside down, the “upper” component described above will become a “lower” component. When a structure is “on” another structure, it is possible that the structure is integrally formed on another structure, or that the structure is “directly” disposed on another structure, or that the structure is “indirectly” disposed on the other structure through other structures.

In this specification, the terms such as “a,” “an,” “the,” and “said” are used to indicate the presence of one or more elements and components. The terms “comprise,” “include,” “have,” “contain,” and their variants are used to be open ended, and are meant to include additional elements, components, etc., in addition to the listed elements, components, etc. unless otherwise specified in the appended claims. If a component is described as having “one or more” of the component, it is understood that the component can be referred to as “at least one” component.

The terms “first,” “second,” etc. are used only as labels, rather than a limitation for a number of the objects. It is understood that if multiple components are shown, the components may be referred to as a “first” component, a “second” component, and so forth, to the extent applicable.

Disjunctive language such as the phrase “at least one of X, Y, or Z,” unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A door interlock, comprising:

a baseplate;

a keeper removably and pivotally attached to the baseplate, the keeper comprising a bore and a grooved opening, the grooved opening configured to connect to an arm, the arm connecting a door to the door interlock;

an actuator comprising a cylinder, the actuator configured to insert or retract the cylinder into or out of the bore, respectively, based on a positioning of an elevator, thereby causing the keeper to move between a locked configuration and an unlocked configuration, and causing the door to either be openable when the keeper is in the unlocked position or unopenable when the keeper is in the locked position;

a first switch attached to the baseplate, the first switch configured to contact the cylinder and transmit information regarding a position of the cylinder to a controller; and a second switch attached to the baseplate, the second switch configured to contact the keeper and transmit information regarding a position of the keeper to the controller.

2. The door interlock of claim 1, wherein:

the second switch is attached to the baseplate at a first location adjacent to a first side of the keeper; and the second switch is removable and attachable to the baseplate at a second location adjacent to a second side of the keeper, the first side being opposite the second side.

3. The door interlock of claim 1, further comprising:

a guide attached to the baseplate, the guide configured to:

prevent axial rotation of the cylinder during movement of the cylinder; and cause the cylinder to contact the first switch when the cylinder is activated by the actuator.

4. The door interlock of claim 3, wherein:

the guide comprises a groove; and the guide is configured to align a pin connected to the cylinder to prevent the axial rotation of the cylinder during movement of the cylinder and to cause the cylinder to contact the first switch when the cylinder is activated by the actuator.

5. The door interlock of claim 4, wherein the guide is substantially U-like in shape.

6. The door interlock of claim 1, wherein the keeper is reversibly attachable to the door interlock to support installation of the door interlock to a left-handed door or a right-handed door.

7. The door interlock of claim 1, wherein the bore comprises an aperture.

8. A door interlock, comprising:

a baseplate;

a keeper removably and pivotally attached to the baseplate, the keeper comprising a bore and a grooved opening, the grooved opening configured to connect to an arm, the arm connecting a door to the door interlock;

an actuator comprising a cylinder, the actuator configured to insert or retract the cylinder into or out of the bore, respectively, based on a positioning of an elevator, thereby causing the keeper to move between a locked configuration and an unlocked configuration, and causing the door to either be openable when the keeper is in the unlocked position or unopenable when the keeper is in the locked position; and a stop attached to the baseplate, wherein the stop is configured to limit rotation of the keeper based on interaction with an arcuate slot of the keeper.

9. The door interlock of claim 8, wherein the door interlock comprises physical dimensions ranging from approximately 2 inches in width, 6.75 inches in length, and 2.25 inches in height to approximately 2 inches in width, 8.75 inches in length, and 2.25 inches in height.

10. The door interlock of claim 8, wherein the bore is circumscribed by material on all sides.

11. The door interlock of claim 8, wherein the bore comprises a closed-perimeter aperture.

12. A locking apparatus for an elevator door, the locking apparatus configured to move between a locked configuration to prevent opening of the elevator door and an unlocked configuration to allow opening of the elevator door, and wherein the locking apparatus is reversible between a first orientation operable with a left-hand door swing and a second orientation operable with a right-hand door swing, wherein the locking apparatus comprises:

a baseplate;

a keeper removably and pivotally attached to the baseplate, the keeper comprising a bore and a grooved opening;

an actuator comprising a cylinder, the actuator configured to:

insert the cylinder into the bore based on a first positioning of an elevator, thereby causing the locking apparatus to be in the locked configuration; and retract the cylinder out of the bore based on a second positioning of the elevator, thereby causing the locking apparatus to change to the unlocked configuration;

a first switch attached to the baseplate, the first switch configured to contact the cylinder and transmit information regarding a position of the cylinder to a controller; and a second switch attached to the baseplate, the second switch configured to contact the keeper and transmit information regarding a position of the keeper to the controller.

13. The locking apparatus of claim 12, wherein:

the second switch is attached to the baseplate at a first location adjacent to a first side of the keeper; and the second switch is removable and attachable to the baseplate at a second location adjacent to a second side of the keeper, the first side being opposite the second side.

14. The locking apparatus of claim 12, further comprising:

a guide attached to the baseplate, the guide configured to:

prevent axial rotation of the cylinder during movement of the cylinder; and cause the cylinder to contact the first switch when the cylinder is activated by the actuator.

15. The locking apparatus of claim 14, wherein:

the guide comprises a groove; and the guide is configured to align a pin connected to the cylinder to prevent the axial rotation of the cylinder during movement of the cylinder and to cause the cylinder to contact the first switch when the cylinder is activated by the actuator.

16. The locking apparatus of claim 12, wherein the first orientation is associated with the keeper configured in a first position and the second orientation is associated with the keeper configured in a second position, the second position being a reversed mirror-image configuration of the first position.

17. The locking apparatus of claim 12, wherein the door interlock comprises a maximum external spatial envelope ranging from approximately 2" in width, 6.75" in length, and 2.25" in height to approximately 2" in width, 8.75" in length, and 2.25" in height.

18. The locking apparatus of claim 12, wherein the locking apparatus defines a maximum external spatial envelope of less than 2" in width, less than 9" in length, and/or less than 2.25" in thickness.

19. The door interlock of claim 18, further comprising:

a guide attached to the baseplate, the guide configured to:

prevent axial rotation of the cylinder during movement of the cylinder; and cause the cylinder to contact the first switch when the cylinder is activated by the actuator.

20. The door interlock of claim 12, wherein the bore comprises a cylindrical aperture.

* * * * *